(12) United States Patent
Ichikawa et al.

(10) Patent No.: US 8,215,963 B2
(45) Date of Patent: Jul. 10, 2012

(54) CHARGING CONNECTOR, AND CHARGING CABLE UNIT

(75) Inventors: Shinji Ichikawa, Toyota (JP); Yoshinori Fujitake, Miyoshi (JP); Shigeo Mori, Makinohara (JP); Takashi Tsukamoto, Makinohara (JP)

(73) Assignees: Toyota Jidosha Kabushiki Kaisha, Toyota (JP); Yazaki Corporation, Tokyo (JP)

( * ) Notice: Subject to any disclaimer, the term of this patent is extended or adjusted under 35 U.S.C. 154(b) by 0 days.

(21) Appl. No.: 13/120,819

(22) PCT Filed: Oct. 26, 2009

(86) PCT No.: PCT/IB2009/007216
§ 371 (c)(1),
(2), (4) Date: Mar. 24, 2011

(87) PCT Pub. No.: WO2010/055379
PCT Pub. Date: May 20, 2010

(65) Prior Publication Data
US 2011/0207358 A1    Aug. 25, 2011

(30) Foreign Application Priority Data

Nov. 17, 2008  (JP) .................................. 2008-293500

(51) Int. Cl.
*H01R 13/62* (2006.01)
(52) U.S. Cl. .......................................... 439/34; 439/490
(58) Field of Classification Search .................. 439/34, 439/490, 476.1, 310
See application file for complete search history.

(56) References Cited

U.S. PATENT DOCUMENTS

| | | | |
|---|---|---|---|
| 5,327,066 A * | 7/1994 | Smith | 320/109 |
| 5,536,173 A | 7/1996 | Fujitani et al. | |
| 5,545,049 A | 8/1996 | Hasegawa et al. | |
| 5,627,448 A * | 5/1997 | Okada et al. | 439/133 |
| 5,639,256 A | 6/1997 | Endo et al. | |
| 5,751,135 A | 5/1998 | Fukushima et al. | |
| 6,091,223 A | 7/2000 | Rogers et al. | |
| 6,945,803 B2 * | 9/2005 | Potega | 439/218 |
| 7,844,303 B2 * | 11/2010 | Jubelirer | 455/569.2 |

(Continued)

FOREIGN PATENT DOCUMENTS

JP    A-06-290836    10/1994

(Continued)

OTHER PUBLICATIONS

International Search Report in International Application No. PCT/IB2009/007216; May 28, 2010.

(Continued)

*Primary Examiner* — Gary F. Paumen
(74) *Attorney, Agent, or Firm* — Oliff & Berridge, PLC

(57) ABSTRACT

A charging connector and a charging cable unit that are capable of driving a load while being maintenance-free and simply constructed is provided. The charging cable unit includes: a charging cable that includes a signal line for sending a control signal, and an electric power line for sending electric power, and that is provided for connecting the vehicle and an electric power source when the vehicle is charged; and a charging connector connected to an end of the charging cable. The charging connector includes: an electric power terminal to which electric power is supplied from the electric power line; a signal terminal to which the control signal is transmitted from the signal line; and a lighting capable of being driven by the control signal from the signal line.

14 Claims, 11 Drawing Sheets

U.S. PATENT DOCUMENTS

2002/0081486 A1    6/2002   Williams
2010/0297883 A1*  11/2010   Burlak et al. ............ 439/620.21

FOREIGN PATENT DOCUMENTS

JP    A-06-325834    11/1994
JP    A-09-161898     6/1997

OTHER PUBLICATIONS

Written Opinion of the International Searching Authority in International Application No. PCT/IB2009/007216; May 28, 2010.
International Preliminary Report on Patentability in International Application No. PCT/IB2009/007216; Nov. 2, 2010.

* cited by examiner

| VOLTAGE | EXAMPLE OF CPLT VOLTAGE | OSCILLATOR'S ACTION |
|---|---|---|
| V1 | 12V ± 0.6V | NONE (EARLY PERIOD) |
| V2 | 9V ± 1V | CPLT OSCILLATION |
| V3 | 6V ± 1V | RELAY ON |

CHARGING CONNECTOR, AND CHARGING CABLE UNIT

BACKGROUND OF THE INVENTION

1. Field of the Invention

This invention relates to a charging connector and a charging cable unit. More particularly, the invention relates to a charging connector and a charging cable unit for use for performing the charging on a vehicle that is constructed so that an electric storage device for driving the vehicle is chargeable from an electric power source outside the vehicle.

2. Description of the Related Art

Electric motor vehicles, hybrid vehicles, fuel cell vehicles, etc. have been drawing attention in recent years as vehicles that are designed factoring in environmental issues. These vehicles are equipped with an electric motor that generates vehicle-driving force, and an electric storage device that stores electric power to be supplied to the electric motor. A hybrid vehicle is equipped with an internal combustion engine as a motive power source in addition to an electric motor. A fuel cell vehicle is equipped with a fuel cell as a direct-current power source provided for driving the vehicle.

Among such vehicles, a vehicle in which a vehicle-driving electric storage device mounted in the vehicle is chargeable from an electric power source of an ordinary household is known. For example, the electric storage device is supplied with electric power by connecting an electrical outlet provided in a house, and a charging opening that is provided on the vehicle, via a charging cable. Hereinafter, a vehicle that allows an electric storage device mounted in the vehicle to be charged from an electric power source provided outside the vehicle will be referred to as "plug-in vehicle". The standards of such a plug-in vehicle have already been enacted in the United States and Japan.

When a plug-in vehicle starts to be charged in the night time, it is difficult to connect a charging connector to the charging opening of the vehicle if it is dark around the charging opening. To overcome this problem, a technology in which a lighting device is provided on the charging connector is disclosed in Japanese Patent Application Publication No. 6-290836 (JP-A-6-290836).

The technology disclosed in Japanese Patent Application Publication No. 6-290836 (JP-A-6-290836) adopts an electric battery as a power source for a lighting that is provided on the connector. However, when the battery is exhausted, it needs to be replaced. As for such battery replacement, it is conceivable that the replacement is performed in the night time after exhaustion of the battery is noticed in an attempt to turn on the lighting. It is difficult to replace the battery in the dark at night. It is also conceivable to have a construction in which, in order to eliminate the need for battery replacement, a power source circuit that generates power source voltage for lighting through the use of a portion of the electric power that is supplied to the vehicle is provided within the charging connector. However, this results in an increased size or scale of the circuit that is to be housed in the charging connector.

Not only in the case of the lighting, but also in the case where a load other than the lighting is driven by the charging connector, how to secure an electric power source becomes a problem.

SUMMARY OF THE INVENTION

This invention provides a charging connector and a charging cable unit that are capable of driving a load while having a maintenance-free and simple construction.

A first aspect of the invention relates to a charging connector that connects a vehicle and an electric power source provided outside the vehicle, in order to charge an electric storage device that is mounted in the vehicle. The vehicle and the electric power source are connected at a time of charging, by a charging cable that includes a signal line for sending a control signal that carries information, and an electric power line for sending electric power. The charging connector includes an electric power terminal to which electric power is supplied from the electric power line, a signal terminal to which the control signal is transmitted from the signal line, and a load capable of being driven by a signal from the signal line.

The charging connector may further include: a lock button that locks the charging connector to a connection portion that is provided in the vehicle; and a switch that connects the signal line and the load according to manipulation of the lock button.

Besides, the lock button may be capable of being manipulated to a locked state and to a released state, and the switch may connect the signal line and the load when in the released state, and may electrically separate the load from the signal line when in the locked state.

Besides, the load may include a lighting that is provided in the connector and that illuminates the connection portion provided in the vehicle.

Besides, the lighting may include a light-emitting diode. Besides, the charging connector may further include a switch that connects the signal line and the load according to presence/absence of alternating current that flows in the electric power line.

Besides, the load may include a display portion that is provided in the charging connector, and that indicates that the charging of the electric storage device is being executed, and the display portion may be switched in state of display by the switch.

The display portion may include a light-emitting diode that is connected to the signal line by the switch when alternating current flows in the electric power line.

Besides, the charging connector may be constructed so as to be connectable to the connection portion provided in the vehicle, and the load may include a lighting that illuminates the connection portion, and a display portion that displays state of execution of the charging, and the charging connector may further include a first switch that connects the signal line and the lighting, and a second switch that connects the signal line and the display portion.

Besides, the charging connector may further include a lock button that locks the charging connector to the connection portion, and the first switch may connect the signal line and the lighting according to manipulation of the lock button, and the second switch may connect the signal line and the display portion when alternating current is flowing in the electric power line.

Besides, the load may include a plurality of light-emitting diodes that function as the lighting and the display portion, and the first switch may be connected to the plurality of light-emitting diodes so as to cause electric current to flow in a first group of at least one light-emitting diode, among the plurality of light-emitting diodes, and the second switch may be connected to the plurality of light-emitting diodes so as to cause electric current to flow in a second group of at least one light-emitting diode, among the plurality of light-emitting diodes, and the first group and the second group may share at least one light-emitting diode.

Besides, the plurality of light-emitting diodes may be connected in series, and the first switch may electrically connect an end of the plurality of light-emitting diodes connected in series to the signal line, and the second switch may electrically connect an intermediate tap of the plurality of light-emitting diodes connected in series, to the signal line.

Besides, the charging connector may be connected to an end of the charging cable, and a connection unit for connection to an electric power source may be connected to another end of the charging cable, and a circuit breaker may be provided between the charging connector and the connection unit in the charging cable.

Besides, the circuit breaker may include a signal generation circuit that generates the control signal, and a resistance element that is connected between the signal line and an output of the signal generation circuit.

A second aspect of the invention relates to a charging cable unit that connects a vehicle and an electric power source provided outside the vehicle, in order to charge an electric storage device that is mounted in the vehicle. The charging cable unit includes: a charging cable which includes a signal line for sending a control signal that carries information, and an electric power line for sending electric power, and which is provided for connecting the vehicle and the electric power source at a time of charging the electric storage device; and a charging connector that is connected to an end of the charging cable, and that is constructed so as to be connectable to a connection portion that is provided in the vehicle. The charging connector includes an electric power terminal to which electric power is supplied from the electric power line, a signal terminal to which the control signal is transmitted from the signal line, and a load capable of being driven by a signal from the signal line.

According to the invention, it is possible to realize a charging connector and a charging cable unit that are capable of driving a load, for example, a lighting, a display portion, etc., while having a construction that is maintenance-free and simple.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
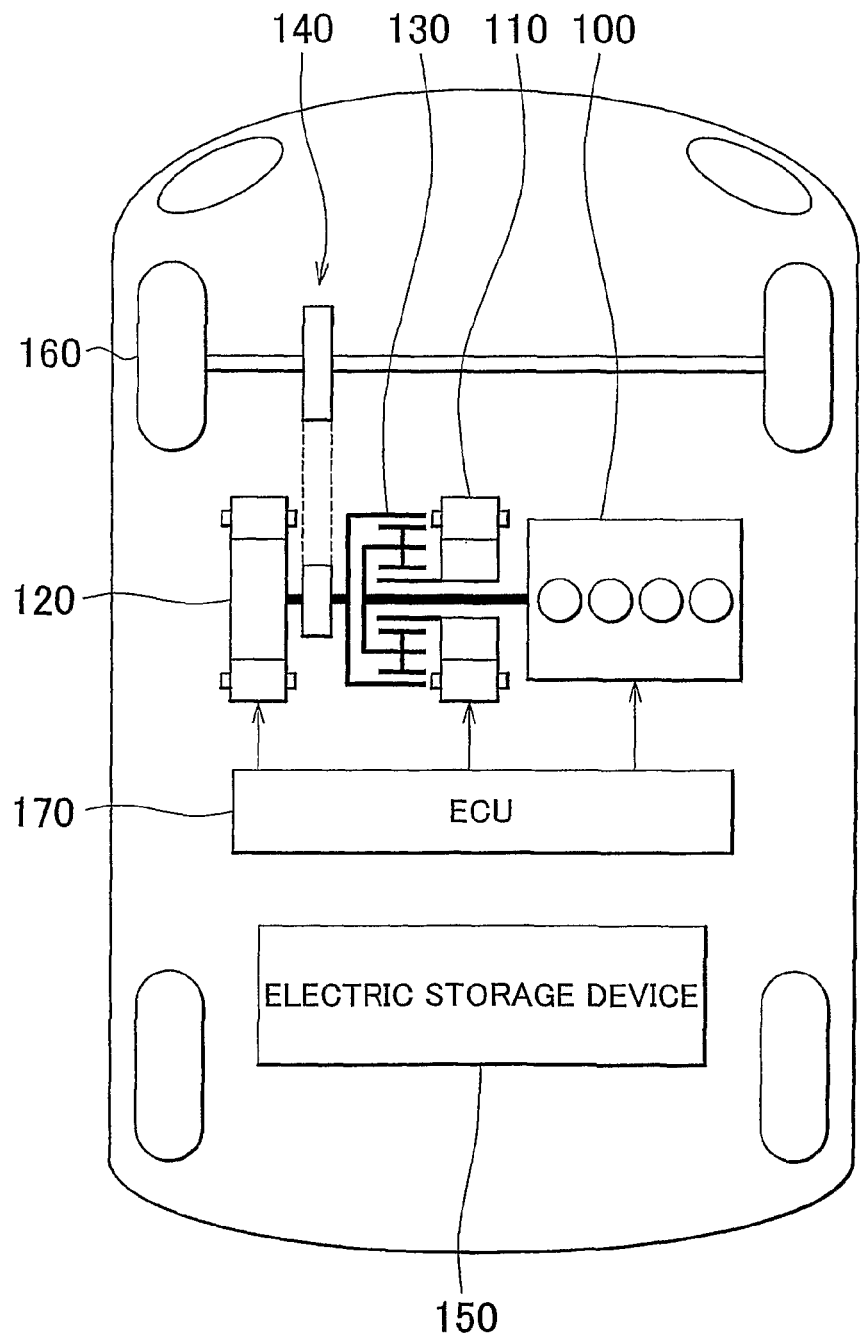
FIG. 1 is an overall block diagram of a plug-in hybrid vehicle shown as an example of a vehicle to which a charging control device according to an embodiment of the invention is applied.

Hereinafter, embodiments of the invention will be described with reference to the drawings. In addition, the same or comparable portions in the drawings are represented by the same reference characters, and the descriptions thereof will not be repeated.

FIG. 1 is an overall block diagram of a plug-in hybrid vehicle shown as an example of a vehicle to which a charging control device according to an embodiment of the invention is applied.

Referring to FIG. 1, this plug-in hybrid vehicle includes an engine 100, a first MG (motor-generator) 110, a second MG 120, a power splitting mechanism 130, a speed reducer 140, an electric storage device 150, driving wheels 160, and an ECU 170.

The engine 100, the first MG 110, and the second MG 120 are linked to the power splitting mechanism 130. This plug-in hybrid vehicle travels by the drive force from at least one of the engine 100 and the second MG 120. The power generated by the engine 100 is split into two paths by the power splitting mechanism 130. That is, one of the paths is a path that transmits power to the driving wheels 160 via the speed reducer 140, and the other one is a path that transmits power to the first MG 110.

The first MG 110 is an alternating-current rotary electric machine, for example, a three-phase synchronous electric motor that has a U-phase coil, a V-phase coil, and a W-phase coil. The first MG 110 generates electric power by using power from the engine 100 that is split by the power splitting mechanism 130. For example, when the state of charge (hereinafter, referred to also as "SOC") of the electric storage device 150 becomes lower than a predetermined value, the engine 100 is started to cause the first MG 110 to generate electric power. The electric power generated by the first MG 110 is converted from alternating current to direct current by an inverter (described below), and then is adjusted in voltage by a converter (described below), and is stored in the electric storage device 150.

The second MG 120 is an alternating-current rotary electric machine, for example, a three-phase synchronous electric motor that has a U-phase coil, a V-phase coil, and a W-phase coil. The second MG 120 generates drive force by using at least one of the electric power stored in the electric storage device 150 and the electric power generated by the first MG 110. The drive force of the second MG 120 is transmitted to the driving wheels 160 via the speed reducer 140. Therefore, the second MG 120 assists the engine 100, or causes the vehicle to travel by the drive force solely from the second MG 120. Incidentally, although in FIG. 1 the driving wheels 160 are shown as front wheels, it is also permissible to drive the rear wheels by the second MG 120 instead of or in addition to the front wheels.

At the time of braking of the vehicle, the second MG 120 is driven by the driving wheels 160 via the speed reducer 140, so that the second MG 120 operates as a generator. Therefore, the second MG 120 operates as a regenerative brake that converts braking energy into electric power. The electric power generated by the second MG 120 is stored in the electric storage device 150.

The power splitting mechanism 130 includes a planetary gear that includes a sun gear, pinions, a carrier, and a ring gear. The pinions are engaged with the sun gear and with the ring gear. The carrier supports the pinions rotatably about their own axes, and is linked to a crankshaft of the engine 100. The sun gear is linked to a rotation shaft of the first MG 110. The ring gear is linked to a rotation shaft of the second MG 120, and to the speed reducer 140.

Figure 2:
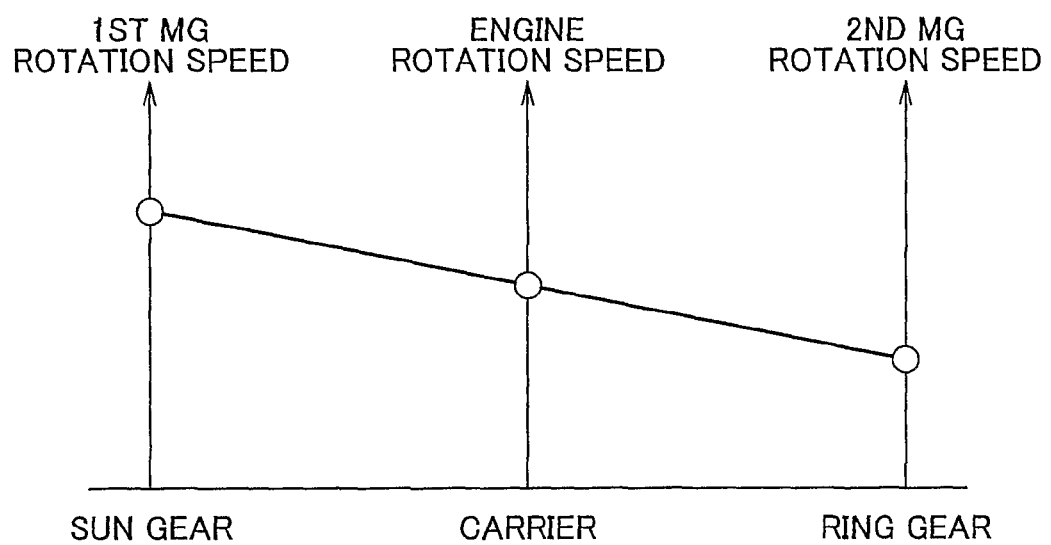
FIG. 2 is an alignment chart for describing the operation of a power splitting mechanism 130 shown in FIG. 1.

FIG. 2 is an alignment chart for describing the operation of the power splitting mechanism 130. As shown in FIG. 2, the engine 100, the first MG 110, and the second MG 120 are interlinked via the power splitting mechanism 130 that is made up of a planetary gear, so that the rotation speeds of the engine 100, the first MG 110, and the second MG 120 have such a relation as to be connected by a straight line in the alignment chart.

Referring back to FIG. 1, the electric storage device 150 includes a secondary battery that is a chargeable-dischargeable direct-current power source, for example, a nickel hydride secondary battery, a lithium-ion secondary battery, etc. The voltage of the electric storage device 150 is, for example, about 200 V. The electric storage device 150 stores the electric power generated by the first MG 110 and the second MG 120, and also stores electric power that is supplied from an electric power source provided outside the vehicle. Incidentally, the electric storage device 150 may also be a large-capacity capacitor, and may be any device as long as the device serves as an electric power buffer that temporarily stores electric power generated by the first MG 110 or the second MG 120, and electric power provided from a power source outside the vehicle, and that supplies the stored electric power to the second MG 120.

The engine 100, the first MG 110, and the second MG 120 are controlled by the ECU 170. Incidentally, the ECU 170 may be divided into a plurality of ECUs separately for the functions of engine control, motor control, voltage control, etc.

Figure 3:
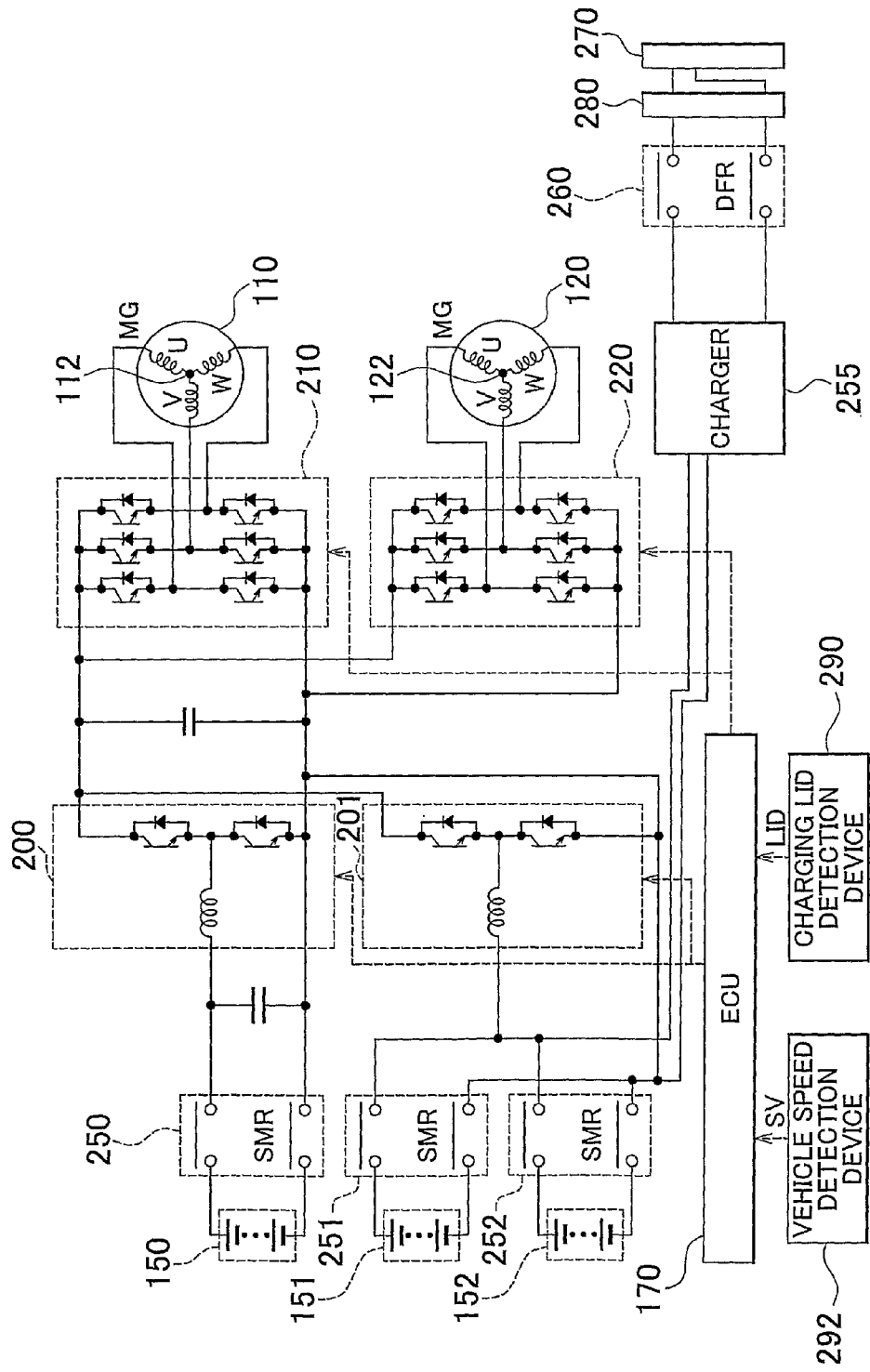
FIG. 3 is an overall construction diagram of an electric system of the plug-in hybrid vehicle shown in FIG. 1.

FIG. 3 is an overall construction diagram of an electric system of the plug-in hybrid vehicle shown in FIG. 1. Referring to FIG. 3, this electric system includes electric storage devices 150 to 152, SMRs (system main relays) 250 to 252, converters 200 and 201, a first inverter 210, a second inverter 220, a first MG 110, a second MG 120, a DFR (dead front relay) 260, an LC filter 280, a charging inlet 270, a charging lid detection device 290, and a vehicle speed detection device 292.

The SMR 250 is provided between the electric storage device 150 and the converter 200. The SMR 250 is a relay for achieving electrical connection/disconnection between the electric storage device 150 and the electric system, and is on/off controlled by the ECU 170. Specifically, when the vehicle runs, and when the electric storage device 150 is charged from a power source outside the vehicle, the SMR 250 is turned on, so that the electric storage device 150 is electrically connected to the electric system. On the other hand, when the vehicle system stops, the SMR 250 is turned off, so that the electric storage device 150 is electrically disconnected from the electric system.

The converter 200 includes a reactor, two NPN transistors, and two diodes. One end of the reactor is connected to the positive electrode side of the electric storage device 150, and the other end thereof is connected to a connecting node between the two NPN transistors. The two NPN transistors are connected in series, and each diode is connected in an inverse-parallel fashion to a corresponding one of the two NPN transistors.

Incidentally, as the NPN transistors, it is possible to use, for example, IGBTs (insulated gate bipolar transistors). Besides, in place of the NPN transistors, electric power switching devices, such as power MOSFETs (metal oxide semiconductor field-effect transistors) or the like, may also be used.

When electric power is supplied from the electric storage device 150 to the first MG 110 or the second MG 120, the converter 200 raises the voltage of the electric power discharged from the electric storage device 150 before supplying the electric power to the first MG 110 or the second MG 120, on the basis of a control signal from the ECU 170. Besides, when the electric storage device 150 is to be charged, the converter 200 lowers the voltage of the electric power supplied from the first MG 110 or the second MG 120 before outputting the electric power to the electric storage device 150.

The SMR 251 is provided between the electric storage device 151 and the converter 201, and the SMR 252 is provided between the electric storage device 152 and the converter 201. The SMRs 251 and 252 are relays for electrical connection/disconnection of the electric storage devices 151 and 152, respectively, to/from the electric system, and are on/off controlled by the ECU 170.

That is, when the vehicle runs, or when the electric storage devices 151 and 152 are charged from an electric power source outside the vehicle, only one of the SMRs 251 and 252 are turned on. The converter 201 performs voltage conversion between the voltage of one of the electric storage devices 151 and 152 that is selected by a corresponding one of the SMRs 251 and 252, and the voltage that is given to the inverters 210 and 220 from the converter 201. On the other hand, when the vehicle system is stopped, the SMRs 250 to 252 are all turned off, so that the electric storage devices 150 to 152 are electrically disconnected from the electric system.

The converter 201 includes a reactor, two NPN transistors, and two diodes. One end of the reactor is connected to the positive electrode side of the electric storage devices 151 and 152, and the other end of the reactor is connected to a connecting node between the two NPN transistors. The two NPN transistors are connected in series, and each diode is connected in an inverse-parallel fashion to a corresponding one of the two NPN transistors.

Incidentally, as the NPN transistors, it is possible to use, for example, IGBTs (insulated gate bipolar transistors). Besides, in place of the NPN transistors, electric power switching devices, such as power MOSFETs (metal oxide semiconductor field-effect transistors) or the like, may also be used.

The first inverter 210 includes a U-phase arm, a V-phase arm, and a W-phase arm. The U-phase arm, the W-phase arm, and the W-phase arm are connected in parallel to each other. Each phase arm includes two serially connected NPN transistors, and a diode is connected to each one of the NPN transistors in an inverse-parallel fashion. The connecting point between the two NPN transistors of each phase arm is connected to an end portion of a corresponding one of the coils of the first MG 110 which is different from a neutral point 112 of the first MG 110.

The first inverter 210 converts the direct-current electric power supplied from the converter 200 into alternating-current electric power, and supplies it to the first MG 110. Besides, the first inverter 210 converts the alternating-current electric power generated by the first MG 110 into direct-current electric power, and supplies it to the converter 200.

The second inverter 220 also has substantially the same construction as the first inverter 210, and the connecting point between the two NPN transistors of each phase arm is connected to an end portion of a corresponding one of the coils of the second MG 120 which is different from a neutral point 122 of the second MG 120.

The second inverter 220 converts the direct-current electric power supplied from the converter 200 into alternating-current electric power, and supplies it to the second MG 120. Besides, the second inverter 220 converts the alternating-current electric power generated by the second MG 120 into direct-current electric power, and supplies it to the converter 200.

Furthermore, when the charging of the electric storage devices 151 and 152 from an electric power source outside the vehicle, a charger 255 converts the alternating-current electric power given from the electric power source outside the vehicle into direct-current electric power on the basis of a control signal from the ECU 170, and supplies the converted direct-current electric power to an electric power line pair between the converter 201 and the SMRs 251 and 252.

The DFR 260 is provided at the power line pair between the charger 255, and the LC filter 280. The DFR 260 is a relay for electrical connection/disconnection between the charging inlet 270 and the electric system, and is on/off controlled by the ECU 170. Specifically, when the vehicle runs, the DFR 260 is turned off, so that the electric system and the charging inlet 270 are electrically separated from each other. On the other hand, when the electric storage device 151 and 152 are charged from an electric power source outside the vehicle, the DFR 260 is turned on, so that the charging inlet 270 is electrically connected to the electric system The LC filter 280 is provided between the DFR 260 and the charging inlet 270. When the electric storage device 151 and 152 are charged from an electric power source outside the vehicle, the LC filter 280 prevents output of high-frequency noise from the electric system of the plug-in hybrid vehicle to the electric power source outside the vehicle.

The charging inlet 270 is an electric power interface for receiving the charging electric power from an electric power source outside the vehicle. When the electric storage device 151 and 152 are charged from an electric power source outside the vehicle, a connector of a charging cable for supplying electric power from the electric power source outside the vehicle to the vehicle is connected to the charging inlet 270.

The ECU 170 generates control signals for driving the SMR 250, the converter 200, the first inverter 210, and the second inverter 220, and thereby controls the actions of these devices.

The charging lid detection device 290 detects the open/closed state of a lid (charging lid) of an opening portion in which the charging inlet 270 is housed, and outputs to the ECU 170 a lid signal LID that shows the open/closed state of the charging lid. The vehicle speed detection device 292 detects the vehicle speed SV of the plug-in hybrid vehicle, and outputs the detected value to the ECU 170.

Figure 4:
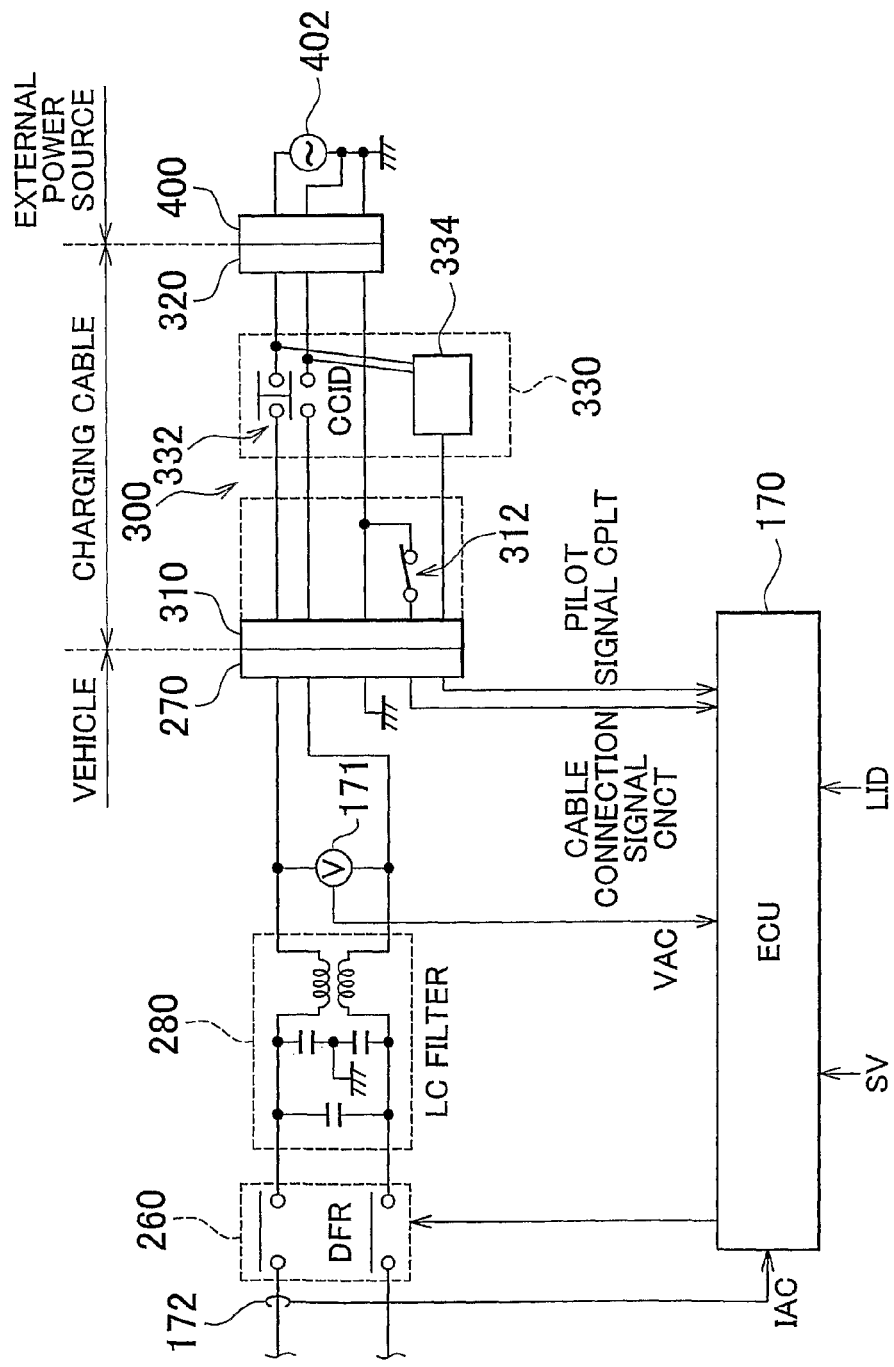
FIG. 4 is a general construction diagram of a portion related to a charging mechanism of the electric system shown in FIG. 3.

FIG. 4 is a general construction diagram of a portion related to a charging mechanism of the electric system shown in FIG. 3. Referring to FIG. 4, a charging cable 300 that links the plug-in hybrid vehicle and the electric power source outside the vehicle together includes a connector 310, a plug 320, and a CCID (charging circuit interrupt device) 330.

The connector 310 is constructed so as to be connectable to the charging inlet 270 that is provided in a vehicle. The connector 310 is provided with a limit switch 312. Then, when the connector 310 is connected to the charging inlet 270, the limit switch 312 switches on, so that a cable connection signal CNCT that shows that the connector 310 is connected to the charging inlet 270 is input to the ECU 170.

The plug 320 is connected to an electrical outlet 400 that is provided in a house. The electrical outlet 400 is supplied with alternating-current electric power from an electric power source 402 (e.g., a system power source).

The CCID 330 includes a relay 332, and a control pilot circuit 334. The relay 332 is provided on a power line pair that is provided for supplying charging electric power from the electric power source 402 to the plug-in hybrid vehicle. The relay 332 is on/off controlled by the control pilot circuit 334. When the relay 332 is off, a cable run that supplies electric power from the electric power source 402 to the plug-in hybrid vehicle is disconnected. On the other hand, when the relay 332 is turned on, it becomes possible to supply electric power from the electric power source 402 to the plug-in hybrid vehicle.

The control pilot circuit 334 acts on the electric power supplied from the electric power source 402, when the plug 320 is connected to the electrical outlet 400. Then, the control pilot circuit 334 generates a pilot signal CPLT that is sent to the ECU 170 of the vehicle via a control pilot line. When the connector 310 is connected to the charging inlet 270, and the electric potential of the pilot signal CPLT declines to a prescribed value, the control pilot circuit 334 oscillates the pilot signal CPLT in a prescribed duty cycle (a ratio of the pulse width to the period of oscillation).

The duty cycle is set on the basis of the rate current that can be supplied from the electric power source 402 to the vehicle via the charging cable 300.

Figure 5:
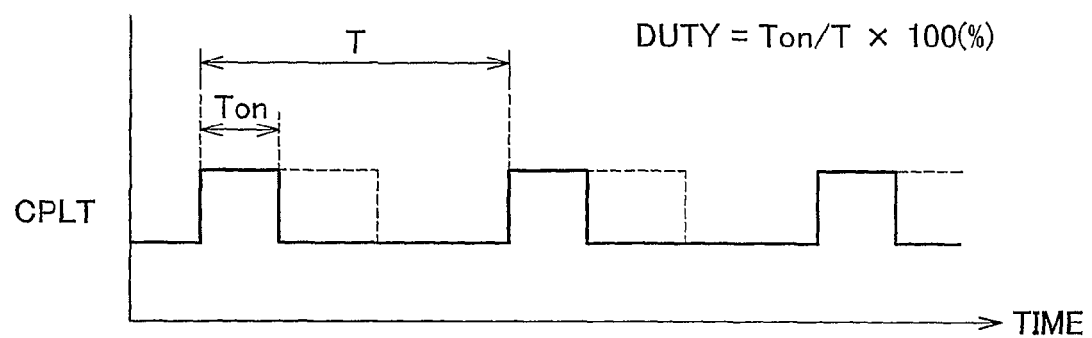
FIG. 5 is a diagram showing a waveform of a pilot signal CPLT generated by a control pilot circuit 334 shown in FIG. 4.

FIG. 5 is a diagram showing a waveform of the pilot signal CPLT generated by the control pilot circuit 334 shown in FIG. 4. With reference to FIG. 5, the pilot signal CPLT changes periodically with a prescribed period T. It is to be noted herein that the pulse width Ton of the pilot signal CPLT is set on the basis of the rated current that can be supplied from the electric power source 402 to the vehicle via the charging cable 300. Then, due to the duty cycle that is represented by the ratio of the pulse width Ton to the period T, the pilot signal CPLT serves to notify the ECU 170 of the vehicle, of the rated current from the control pilot circuit 334.

Incidentally, the rated current is determined separately for each charging cable. Different kinds of charging cables have different rated currents, and therefore have different duty cycles of the pilot signal CPLT. Then, the ECU 170 of the vehicle receives, via the control pilot line, the pilot signal CPLT sent from the control pilot circuit 334 provided in the charging cable 300, and detects the duty cycle of the pilot signal CPLT thus received. Therefore, the ECU 170 is able to detect the rated current that can be supplied from the electric power source 402 to the vehicle via the charging cable 300.

Referring back to FIG. 4, the control pilot circuit 334 turns on the relay 332 when the preparation for charging is completed on the vehicle side.

The voltage sensor 171 and the current sensor 172 are provided on the vehicle side. The voltage sensor 171 detects the voltage VAC between the pair of power lines between the charging inlet 270 and the LC filter 280, and outputs the detected voltage value to the ECU 170. The current sensor 172 detects the current IAC that flows through one of the pair of power lines from the DFR 260 toward the charger 255, and outputs the detected current value to the ECU 170.

Figure 6:
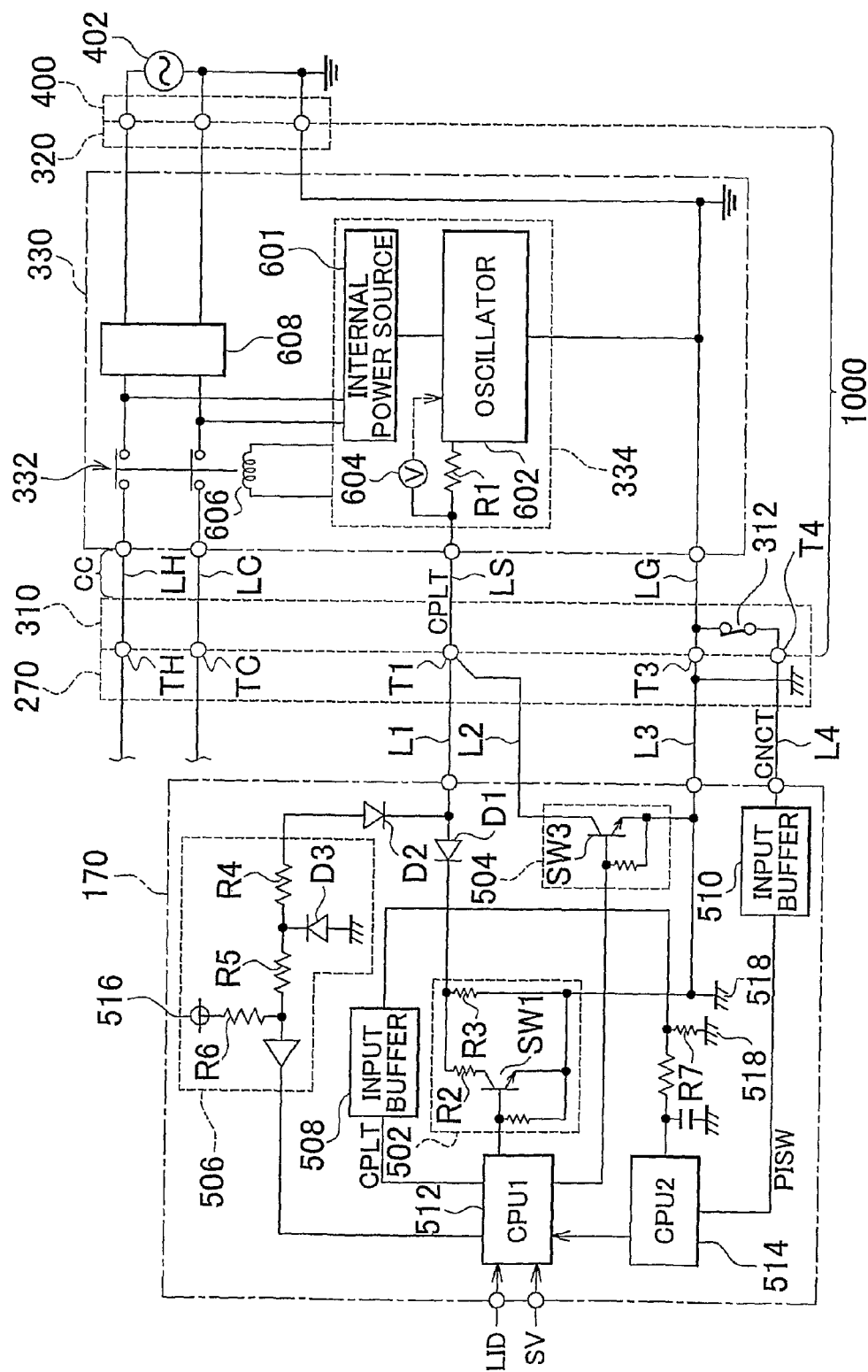
FIG. 6 is a diagram for describing the charging mechanism shown in FIG. 4, more in detail.

FIG. 6 is a diagram for describing the charging mechanism shown in FIG. 4, more in detail. Referring to FIG. 6, the CCID 330 includes an electromagnetic coil 606, and an electric leak detector 608, in addition to the relay 332 and the control pilot circuit 334. The control pilot circuit 334 includes an internal power source 601, an oscillator 602, a resistance element R1, and a voltage sensor 604.

The oscillator 602 operates on a power source voltage that is generated by the internal power source 601 on the basis of the electric power supplied from the electric power source 402.

Figures 7, 8:
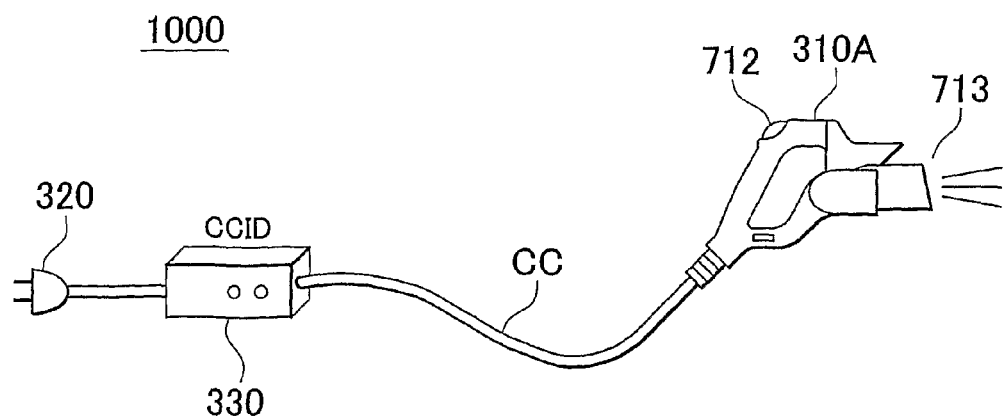
FIG. 7 is a diagram for describing the action of an oscillator 602.
FIG. 8 is a diagram showing a general external appearance of a charging cable unit 1000 of this embodiment.

FIG. 7 is a diagram for describing the action of the oscillator 602. Referring to FIG. 6 and FIG. 7, the oscillator 602 outputs a non-oscillating signal when the electric potential of the pilot signal CPLT detected by a voltage sensor 604 is at or near a prescribed potential V1 (e.g., 12±0.6 V), and outputs a signal that oscillates with a prescribed period (e.g., 1 kHz) and a duty cycle, when the electric potential of the pilot signal CPLT declines from the potential V1 to a potential V2 (e.g., 9±1 V). Incidentally, the electric potential of the pilot signal CPLT is manipulated by switching the resistance value of a resistance circuit 502 of the ECU 170 as described below. Besides, the duty cycle is set on the basis of the rated current that can be supplied from the electric power source 402 to the vehicle via the charging cable, as described above.

Besides, the control pilot circuit 334 supplies current to an electromagnetic coil 606 when the electric potential of the pilot signal CPLT is at or near a potential V3 (e.g., 6±1 V). The electromagnetic coil 606, when supplied with current from the control pilot circuit 334, generates electromagnetic force, thus turning on the relay 332.

The electric leak detector 608 is provided in the charging cable CC that includes a power line pair for supplying charging electric power from the electric power source 402 to the plug-in hybrid vehicle, and detects the presence/absence of electric leak. Concretely, the electric leak detector 608 detects the state of balance between the currents that flow through a "hot" line LH and a "cold" line LC within the charging cable CC in mutually opposite directions, and detects occurrence of electric leak when the state of balance collapses. Incidentally, although not particularly shown in the drawings, when electric leak is detected by the electric leak detector 608, the supply of electricity to the electromagnetic coil 606 is shut off, and the relay 332 is turned of.

The ECU 170 includes a resistance circuit 502, a connection circuit 504, a voltage generation circuit 506, input buffers 508 and 510, and CPUs (central processing units) 512 and 514.

The resistance circuit 502 includes pull-down resistors R2 and R3, and a switch SW1. The pull-down resistor R2 and the switch SW1 are connected in series between a control pilot line L1 through which the pilot signal CPLT is passed, and a vehicle electrical ground 518. The pull-down resistor R3 is connected between the control pilot line L1 and the vehicle electrical ground 518. The pull-down resistor R3 is connected parallel to the pull-down resistor R2 and the switch SW1 that are connected in series. The switch SW1 is turned on/off according to a control signal from the CPU 512.

The resistance circuit 502 switches the electric potential of the pilot signal CPLT by the switch SW1 turning on/off according to the control signal from the CPU 512. That is, when the switch SW1 is off according to the control signal from the CPU 512, the electric potential of the pilot signal CPLT is set at the prescribed potential V2 (e.g., 9V) by the pull-down resistor R3. Besides, when the switch SW1 is turned on according to the control signal from the CPU 512, the electric potential of the pilot signal CPLT is set at the prescribed potential V3 (e.g., 6 V) by the pull-down resistors R2 and R3.

The connection circuit 504 includes a switch SW3. The switch SW3 is connected between a signal line L2 that branches from an input terminal T1 for the pilot signal CPLT that is provided in the charging inlet 270, and a grounding conductor L3 that is connected to the vehicle electrical ground 518. The switch SW3 is turned on/off according to the control signal from the CPU 512.

The connection circuit 504 is provided for detecting a break of the control pilot line L1 through which the pilot signal CPLT is passed. Specifically, when the connector 310 is not connected to the charging inlet 270, a voltage divided between the pull-up resisters R4 to R6 within the voltage generation circuit 506 and the pull-down resister R7 connected to the vehicle electrical ground 518 occurs in the control pilot line L1. Then, if the electric potential of the control pilot line L1 declines to the ground level when the switch SW3 of the connection circuit 504 turns on, it can be determined that the control pilot line L1 is normal. On the other hand, if the electric potential of the control pilot line L1 does not decline to the ground level even though the switch SW3 is on, it can be determined that the control pilot line L1 has a break within the vehicle.

Incidentally, when the connector 310 is connected to the charging inlet 270, that is, when the electric storage devices 151 and 152 in FIG. 3 are charged from the electric power source 402, it is possible to perform a charging control that uses the pilot signal CPLT, without affecting the electric potential of the control pilot line L1 (electric potential of the pilot signal CPLT), by keeping the switch SW3 off. Specifically, the switch SW3 is off according to the control signal from the CPU 512, when the connector 310 is connected to the charging inlet 270. When the connector 310 is not connected to the charging inlet 270, the switch SW3 is on according to the control signal from the CPU 512.

The voltage generation circuit 506 includes a power source node 516, the pull-up resistors R4 to R6, and a diode D3. When the connector 310 is not connected to the charging inlet 270, the voltage generation circuit 506 generates on the control pilot line L1 a voltage that is determined by the voltage of the power source node 516 (e.g., 12 V) and the pull-up resistors R4 to R6 and the pull-down resistor R7 that is connected to the vehicle electrical ground 518.

The input buffer 508 receives the pilot signal CPLT of the control pilot line L1, and outputs the pilot signal CPLT to the CPU 512. The input buffer 510 receives the cable connection signal CNCT from a signal line L4 that is connected to a limit switch 312 of the connector 310, and outputs the cable connection signal CNCT to the CPU 514.

The signal line L4 has a voltage applied from the ECU 170. When the connector 310 is connected to the charging inlet 270, the limit switch 312 turns on, so that the electric potential of the signal line L4 becomes equal to a ground level. Specifically, the cable connection signal CNCT becomes an L (logical low) level when the connector 310 is connected to the charging inlet 270, and becomes an H (logical high) level when the connector 310 is not connected to the charging inlet 270.

The CPU 514 receives the cable connection signal CNCT from the input buffer 510, and determines the presence/absence of connection between the connector 310 and the charging inlet 270 on the basis of the cable connection signal CNCT. Then, the CPU 514 outputs the result of the determination to the CPU 512.

The CPU 512 receives the pilot signal CPLT from the input buffer 508, and receives from the CPU 514 the result of the determination regarding the connection between the connector 310 and the charging inlet 270. Then, the CPU 512 detects the rated current that can be supplied from the electric power source 402 to the plug-in hybrid vehicle on the basis of the pilot signal CPLT that has started oscillating according to the connection of the connector 310 to the charging inlet 270.

After the rated current is detected and the preparation for the charging of the electric storage devices 151 and 152 from the electric power source 402 is completed, the CPU 512 activates a control signal that is output to the switch SW1, and turns on the DFR 260 shown in FIG. 4. Due to this, the alternating-current electric power from the electric power source 402 is given to the electric power line pair between the converter 201 and the SMRs 251 and 252, so that the charging control of the electric storage devices 151 and 152 are executed.

In Embodiment 1, a lighting device is attached to the charging connector in order to support the night-time charging of the plug-in vehicle. The lighting device may be a light-emitting diode. The electric power source of the lighting is supplied through the use of the existing wiring.

FIG. 8 is a diagram showing a general external appearance of a charging cable unit 1000 of this embodiment.

Referring to FIG. 8, the charging cable unit 1000 includes a plug 320 for connection to the electric power source outside the vehicle, the CCID 330, the charging cable CC, and a charging connector 310A. The charging connector 310A has a connection portion 713 that is connected to the vehicle. The charging connector 310A is provided with a lighting so as to produce illumination in the same direction as direction in which the connection portion 713 is connected.

The charging connector 310A is connected to an end of the charging cable CC. A plug 320, as a connection unit for connection to the electric power source, is connected to another end of the charging cable CC. The CCID 330, which is an electrical leak circuit breaker, is provided on the charging cable CC between the charging connector 310A and the plug 320.

The charging connector 310A is provided with a lock button 712. A lock mechanism (not shown) is provided so that once the charging connector 310A is connected to the vehicle, the connector 310A does not fall apart even if a force acts in a pull-off direction. If the lock button 712 is pressed, it becomes possible to separate the charging connector 310A from the vehicle.

The provision of the lighting on or near the connection portion 713 facilitates the operation of connecting the charging connector to the vehicle when the charging begins in the night time.

Figure 9:
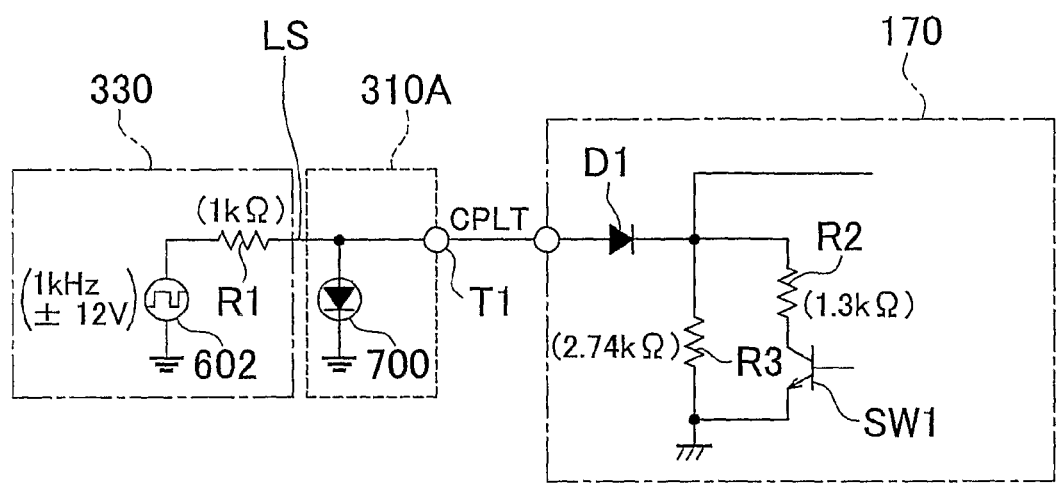
FIG. 9 is a diagram showing a portion of the charging cable unit 1000, and a connecting portion of a vehicle-side ECU.

FIG. 9 shows a portion of the charging cable unit 1000, and a connecting portion of a vehicle-side ECU. FIG. 9 is a simplified illustration of a portion of the construction shown in FIG. 6, showing the position at which a light-emitting diode element 700 is provided as a lighting device.

With reference to FIG. 6 and FIG. 9, the charging cable unit 1000 that connects the electric power source outside the vehicle to the vehicle in order to charge the electric storage device mounted in the vehicle will be described. The charging cable unit 1000 is provided with the charging cable CC which includes the signal line LS for sending the control signal that communicates information, and the "hot" line LH and the "cold" line LC that are electric power lines for sending electric power, and which connects the vehicle and the electric power source 402 at the time of charging, and the charging connector 310A that is connected to an end of the charging cable CC, and that is constructed so as to be connectable to the connection portion that is provided on the vehicle. The charging connector 310A includes electric power terminals TH and TC to which electric power is supplied from the electric power lines LH and LC, a signal terminal T1 to which the pilot signal CPLT is transmitted from the signal line LS, and a load that can be driven by the signal CPLT from the signal line LS.

The load includes the lighting that is provided in the connector 310A, and that illuminates the connection portion that is provided on the vehicle. The lighting includes a light-emitting diode element 700.

That is, in Embodiment 1, in a cable unit that is connected to an external electric power source in order to charge an electric storage device mounted in a vehicle that is capable of traveling on electric energy, the signal line LS and the signal CPLT for giving and receiving information regarding the power source capacity between the vehicle and the cable unit are utilized. When the activation potential of the signal CPLT is applied to the light-emitting diode, the light-emitting diode turns on. The signal CPLT is a signal that is standardized in conjunction with the charging of the plug-in vehicle, and is therefore essentially needed for the cable unit. By turning on the light-emitting diode through the use of this signal, there is an advantage of eliminating the need for a dedicated electric power source or a dedicated wiring for the lighting device.

Therefore, the night-time lighting is realized merely by adding a light-emitting diode.

In Embodiment 1, the lighting is turned on by using the signal CPLT. However, after the charging connector is connected, the electric power consumption can be reduced by turning off the lighting.

Figure 10:
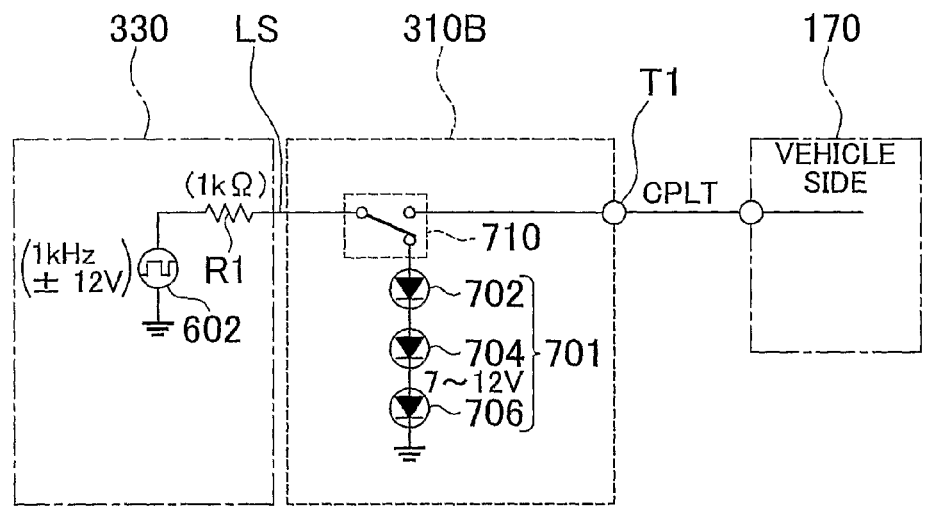
FIG. 10 is a diagram showing a portion of a charging cable unit in Embodiment 2, and a connecting portion of a vehicle-side ECU.

FIG. 10 shows a portion of a charging cable unit in Embodiment 2, and a connecting portion of a vehicle-side ECU. FIG. 10 is a simplified illustration of a portion of the construction shown in FIG. 6, showing the position at which the light-emitting diode elements 702, 704 and 706 as a lighting 701 are provided.

The construction shown in FIG. 10 includes a charging connector 310B in place of the charging connector 310A in the construction of the cable unit of Embodiment 1 shown in FIG. 9. Other portions are substantially the same as those of Embodiment 1, and therefore the descriptions thereof will not be repeated.

The charging connector 310B includes the light-emitting diode elements 702, 704 and 706 that are connected in series, and a switch 710 that connects the signal line LS connected to an end of a resistor R1 selectively to one of a terminal T1 for connection to the vehicle, and the group of the series-connected light-emitting diode elements 702, 704 and 706. Although the number of the light-emitting diode elements 702, 704 and 706 is not limited to three, the total voltage of the light-emitting diode elements in the forward direction is adjusted to, for example, about 7 V to 12 V, so as to turn on during a state other than the on-state of the relay in FIG. 7.

Thus, the switch 710 that selects one of the terminal T1 and the lighting 701 to apply the signal CPLT to. Then, the lighting is kept on until the charging connector 310B is connected to the vehicle. After the charging connector 310B is connected to the vehicle, the signal CPLT is passed to the terminal T1 via the switch 710. Thus, without impairing the function of the signal CPLT, the lighting can be turned on only when necessary.

Figure 11:
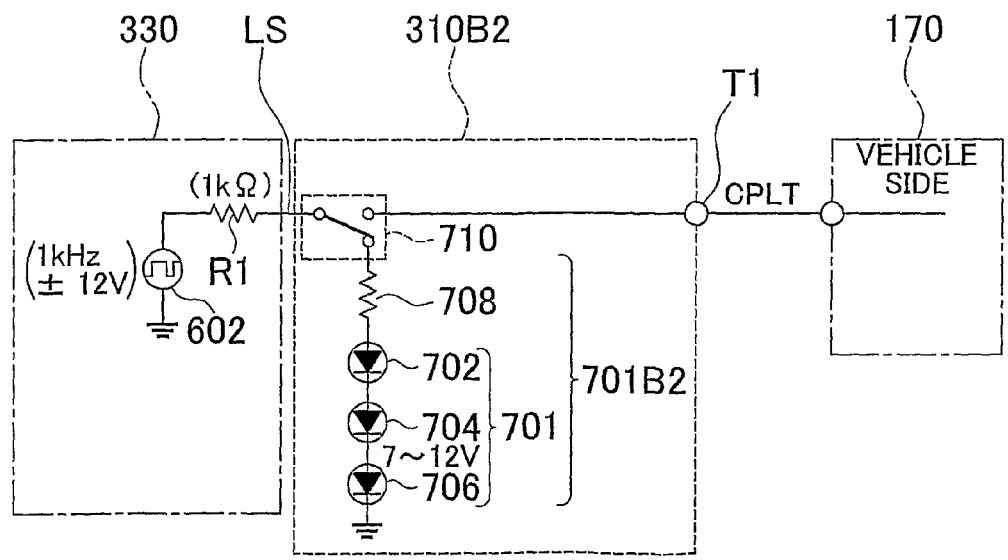
FIG. 11 is a diagram for describing a modification of the lighting shown in FIG. 10.

FIG. 11 is a diagram for describing a modification of the lighting shown in FIG. 10. In FIG. 11, a construction as shown in FIG. 10 includes a charging connector 310B2 instead of the charging connector 310B. The charging connector 310B2 includes a lighting 701B2 in place of the lighting 701 in the construction of the charging connector 310B. The lighting 701B2 is a combination of series-connected light-emitting diode elements 702, 704 and 706, and a resistor 708 that is connected in series to the diode elements. Although in FIG.

10, the voltage is adjusted by the number of light-emitting diodes or the characteristic thereof, it is also permissible to use the resistor 708 for voltage adjustment, instead of the light-emitting diodes. The resistor 708 may be, for example, a variable resistor.

In Embodiment 2, the switch 710 is provided, and it is possible to turn on the lighting only when needed. The time when the lighting is needed is a time when the charging connector 310B is not connected to the vehicle yet.

It is to be noted herein that the charging connector is provided with a lock button 712 as described above with reference to FIG. 8. If the lock button 712 is appropriately utilized, the lighting can be manipulated without adding an manipulating portion such as a push button or the like.

Figure 12:
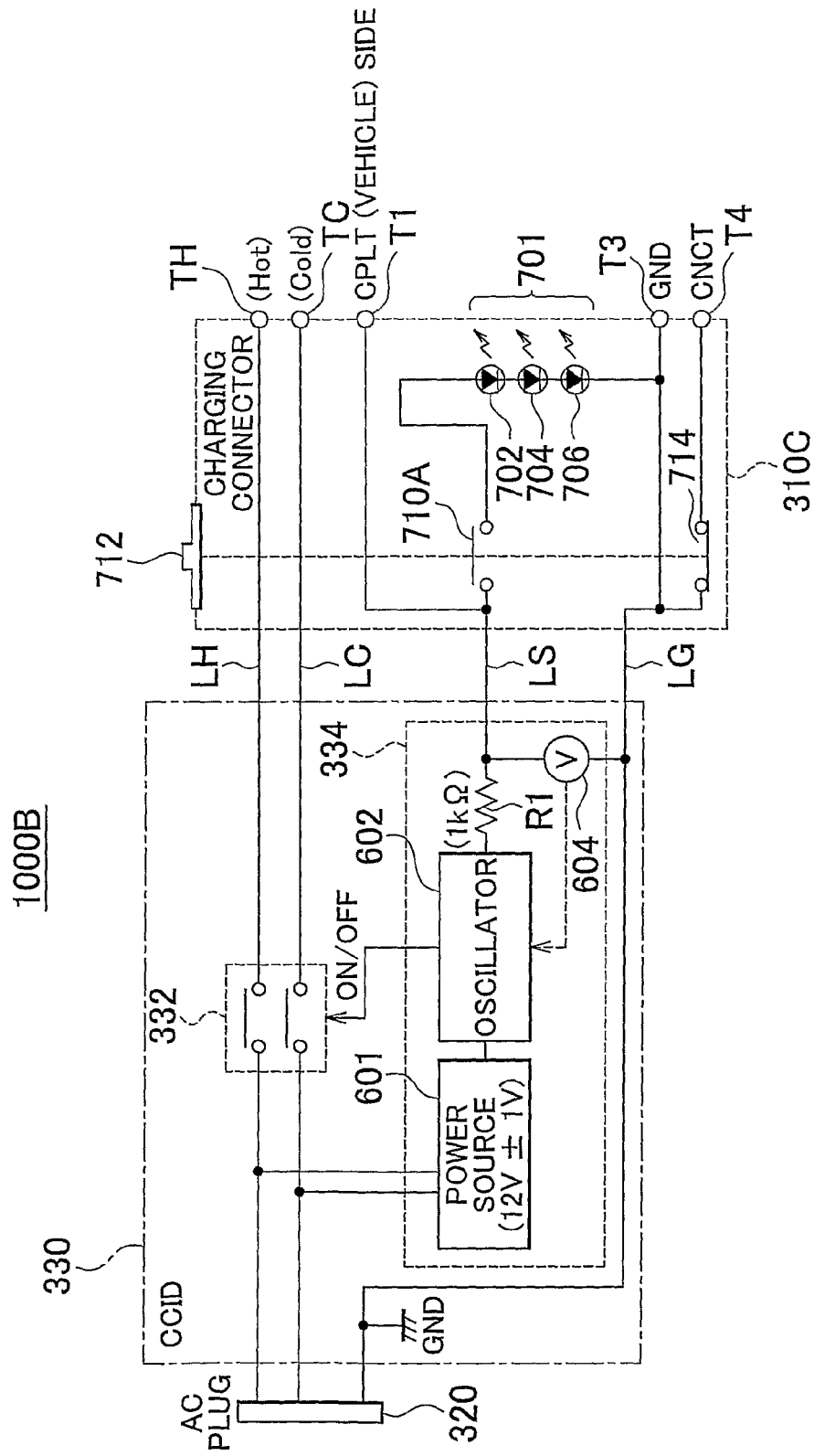
FIG. 12 is a circuit diagram showing a construction of the charging cable unit in a modification of Embodiment 2.

FIG. 12 is a circuit diagram showing a construction of the charging cable unit in a modification of Embodiment 2.

With reference to FIG. 12, a charging cable unit 1000B that connects an electric power source outside the vehicle to the vehicle in order to charge an electric storage device mounted in the vehicle will be described. The charging cable unit 1000B is provided with the charging cable CC which includes a signal line LS for sending the control signal that carries information, and a "hot" line LH and a "cold" line LC that are electric power lines for sending electric power, and a ground line LG, and which connects the vehicle and an electric power source 402 at the time of charging, and a charging connector 310C that is connected to an end of the charging cable CC, and that is constructed so as to be connectable to a connection portion that is provided in the vehicle. The charging connector 310C includes electric power terminals TH and TC to which electric power is supplied from the electric power lines LH and LC, a signal terminal T1 to which the pilot signal CPLT is transmitted from the signal line LS, and a load that can be driven by the signal CPLT from the signal line LS.

The load includes the lighting device that is provided in the connector 310C, and that illuminates the connection portion that is provided in the vehicle. The lighting 701 includes light-emitting diode elements 702, 704 and 706.

That is, in this modification of Embodiment 2, in a cable unit that is connected to an external electric power source in order to charge an electric storage device mounted in a vehicle that is capable of traveling on electric energy, the signal line LS and the signal CPLT for giving and receiving information regarding the power source capacity between the vehicle and the cable unit are utilized. When the activation potential of the signal CPLT is applied to the light-emitting diodes, the light-emitting diodes turn on. The signal CPLT is a signal that is standardized in conjunction with the charging of the plug-in vehicle, and is therefore essentially needed for the cable unit. By turning on the light-emitting diode through the use of this signal, there is an advantage of eliminating the need for a dedicated electric power source or a dedicated wiring for the lighting device.

In this modification of Embodiment 2, the charging connector 310C is provided further with a lock button 712 that locks the charging connector to the connection portion that is provided on the vehicle, and a switch 710A that connects the signal line LS and the lighting 701, which is a load, according to the manipulation of the lock button 712.

The lock button 712 is capable of being manipulated to a locked state and to a released state. If the lock button 712 is pressed, the state of the lock button enters the released state, so that the charging connector 310C can be separated from the vehicle. If the lock button 712 is un-pressed, the state of the lock button becomes the locked state in which the charging connector 310C, if connected to the vehicle, is locked so as not to separate thereof. The switch 710A connects the signal line LS to the lighting 701, which is a load, when the switch 710A is in the released state, and electrically separates the lighting 701 from the signal line LS when the switch 710*a* is in the locked state.

The switch 714 operates in a complementarily fashion to the switch 710A. Specifically, the switch 714 connects the grounding conductor LG and the terminal T4 when the lock button 712 is released, and disconnects the grounding conductor LG and the terminal T4 from each other when the lock button 712 is pressed.

The CCID 330, which is a circuit breaker, includes an oscillator 602 that functions as a signal generation circuit that generates the pilot signal CPLT, and a resistance element R1 that is connected between an output side of the oscillator 602 and the signal line LS.

Incidentally, other portions of the CCID 330 and the plug 320 have been described in detail with reference to FIG. 6, and their descriptions will not be repeated.

Thus, the signal CPLT and the lighting 701 are connected by pressing the lock button 712 before the connector is connected. Besides, the voltage between the two opposite ends of the series-connected light-emitting diodes used as the lighting 701 is adjusted to the range of 7 to 12 V so as to avoid falsely determining that the CCID side is connected to the vehicle. For example, the series connection of about 3 to 5 light-emitting diodes is preferable. Incidentally, the voltage may also be adjusted by resistance. This construction makes it possible to turn on the lighting in the night time, and therefore improves operability. Besides, since the lighting is not turned on during the charging, the electric power consumption can be reduced. Furthermore, since the lock button can also be used as a manipulating portion for manipulating the switch, the added component parts can be reduced in number.

In Embodiment 3 of the invention, a display portion that indicates that the charging is being performed is provided as a load that is provided within the connector. The display portion may be, for example, an indicator made up of a light-emitting diode, or the like.

Figure 13:
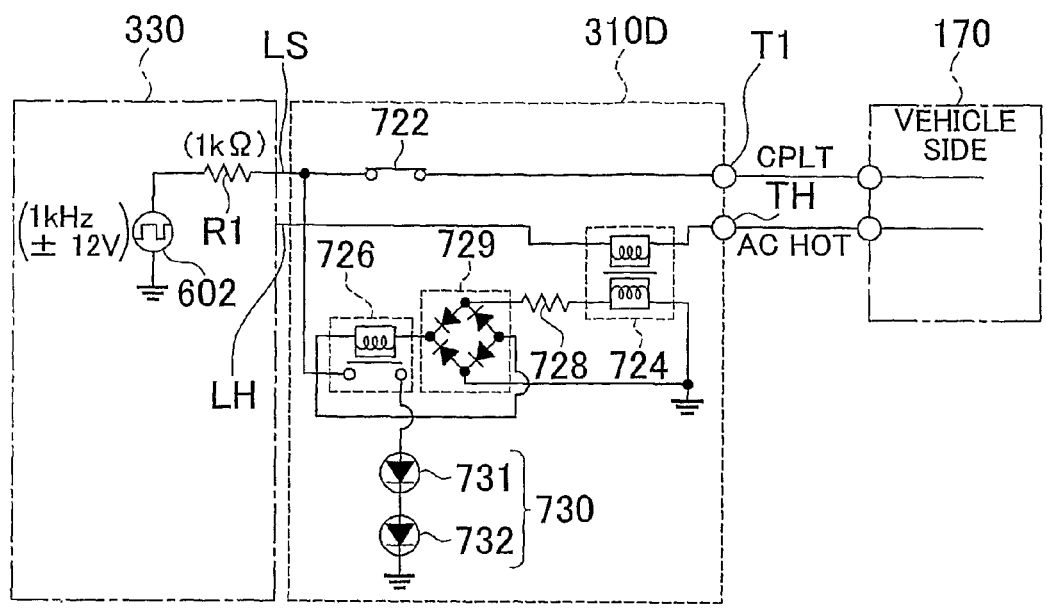
FIG. 13 shows a portion of a charging cable unit in Embodiment 3 and a connecting portion of a vehicle-side ECU.

FIG. 13 shows a portion of a charging cable unit in Embodiment 3 and a connecting portion of a vehicle-side ECU. FIG. 13 is a simplified illustration of a portion of the construction shown in FIG. 6, showing the position at which light-emitting diode elements 731 and 732 as a display portion 730 are provided.

Referring to FIG. 13, the charging connector 310D includes an electric power terminal TH to which electric power is supplied from electric power lines LH and LC, a signal terminal T1 to which a pilot signal CPLT is transmitted from a signal line LS, and a load that can be driven by the signal CPLT from the signal line LS.

The charging connector 310D further includes a switch 726 that connects the signal line LS and the load according to the presence/absence of charging current that flows through the electric power line LH.

The load includes the display portion 730 that is provided in the charging connector 310D, and that indicates that the charging of the electric storage device is being executed. The display portion 730 is switched in the display state by the switch 726.

The display portion 730 includes light-emitting diodes 731, 732 that are connected to the signal line LS by the switch 726 when the charging current flows through the electric power line LH.

The switch 726 is a relay that operates upon obtaining an operating current from a transformer 724. In the transformer 724, when alternating current flows through the electric power line LH, the passage of alternating current through the primary coil generates voltage on the secondary coil side. A resistor 728 restricts the current that flows to the secondary side of the transformer 724. A rectifier 729 converts the alternating current from the second oil of the transformer 724 into direct current, whereby the switch 726 is driven. The switch 726 is, for example, a relay, and the operating coil of the switch 726 is connected in series to the secondary coil of the transformer 724 and the resistance 728, via the rectifier 729.

After the connector 310D is connected, the relay 260, and the relay 332 of the CCID 300 shown in FIG. 4 becomes conductive, and when the alternating current begins to flow, and by using this timing as a trigger, the signal line LS, and the light-emitting diodes 731, 732 are connected by the switch 726. A drive power source of the switch 726 is the transformer 724 that is given alternating current that flows through the electric power line LH. The voltage between the two opposite ends of the light-emitting diodes of the display portion may be set to about 6 V (two to three light-emitting diodes) so as to harmfully affecting the signal CPLT.

In Embodiment 4, the charging connector is provided with both lighting and a display portion.

Figure 14:
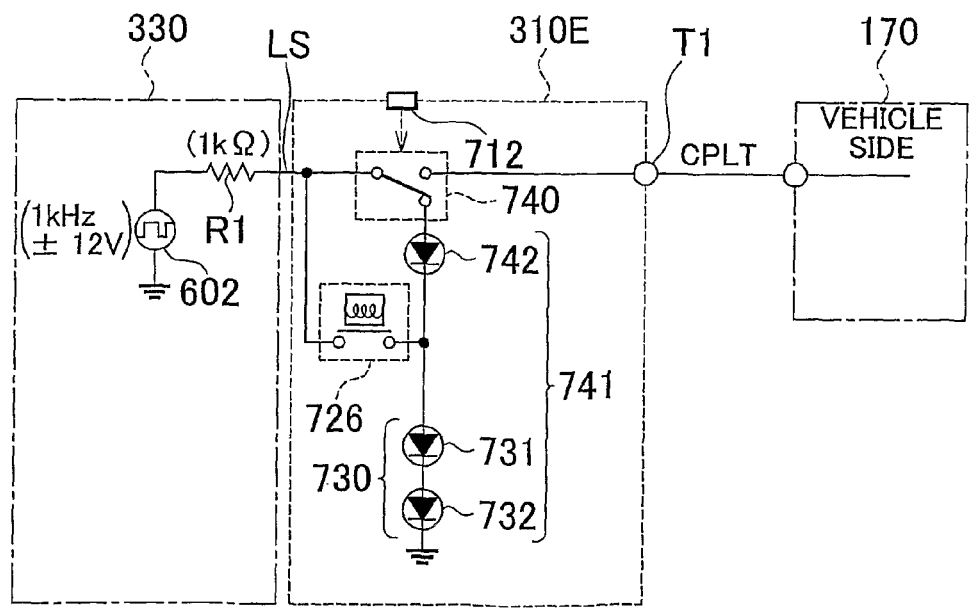
FIG. 14 is a circuit diagram showing a construction of a charging connector 310E in Embodiment 4.

FIG. 14 is a circuit diagram showing a construction of a charging connector 310E in Embodiment 4. Referring to FIG. 14, the charging connector 310E having substantially the same construction of the charging connector 310D shown in FIG. 13 includes a switch 740 instead of the switch 722, and also includes a light-emitting diode 742 that is connected in series to light-emitting diodes 731 and 732.

The charging connector 310E is constructed so as to be connectable to a connection portion that is provided on a vehicle. The load include a lighting 741 that illuminates the connection portion, and a display portion 730 that displays the state of execution of charging. The charging connector 310E is provided further with a first switch 740 that connects the signal line LS and the lighting 741, and a second switch 726 that connects the signal line LS and the display portion 730.

Although not shown in FIG. 14, in the charging connector 310E, a transformer 724 and a resistor 728 are connected in series to a driving coil of the switch 726 via a rectifier 729, as in the construction shown in FIG. 13.

The charging connector 310E further includes a lock button 712 that locks the charging connector to the connection portion of the vehicle. The first switch 740 connects the signal line LS and the lighting 741 according to the manipulation of the lock button 712. The second switch 726 connects the signal line LS and the display portion 731 when charging current is flowing through an electric power line LH.

The load includes a plurality of light-emitting diodes 742, 731 and 732 that function as the lighting 741 and the display portion 731. The first switch 740 is connected to the plurality of light-emitting diodes so that current flows through a first group of light-emitting diodes (742, 731 and 732), among the plurality of light-emitting diodes. The second switch 726 is connected to the plurality of light-emitting diodes so that current flows through a second group of light-emitting diodes (731 and 732), among the plurality of light-emitting diodes. The first group and the second group share at least one light-emitting diode (731 and 732).

The plurality of light-emitting diodes 742, 731 and 732 are connected in series: The first switch 740 electrically connects an end of the series-connected light-emitting diodes 742, 731 and 732 to the signal line LS. The second switch 726 electrically connects an intermediate tap of the series-connected light-emitting diodes 742, 731 and 732 (a connecting node between the diodes 742 and 731) to the signal line LS.

Thus, since the display portion 730 employs more than one light-emitting diode of the light-emitting diodes of the lighting 741, the number of light-emitting diodes used can be made less than in the case where the combination of Embodiment 2 and Embodiment 3 is directly applied to the charging connectors.

Incidentally, although in each of the foregoing embodiments, the circuit breaker CCID is provided in an intermediate portion of the charging cable CC, the location of the circuit breaker CCID does not need to be an intermediate portion of the charging cable CC. The circuit breaker CCID may also be integrated with the charging connector that connects to the vehicle, or the circuit breaker CCID may also be integrated with the connector that connects to the external electric power source.

It is to be understood that the embodiments disclosed herein are mere illustrative in every respect, and not restrictive at all. It is intended that the scope of the invention is shown not by the foregoing description of the embodiments but by the attached claims for patent, and include all the modifications within the meaning and scope equivalent to the claims for patent.

The invention claimed is:

1. A charging connector that connects a vehicle and an electric power source provided outside the vehicle, in order to charge an electric storage device that is mounted in the vehicle, characterized in that:
    the vehicle and the electric power source are connected at a time of charging, by a charging cable that includes a signal line for sending a control signal that carries information, and an electric power line for sending electric power; and
    the charging connector includes an electric power terminal to which electric power is supplied from the electric power line, a signal terminal to which the control signal is transmitted from the signal line, and a load capable of being driven by the control signal from the signal line; and wherein
    the load includes a lighting that is provided in the connector and that illuminates the connection portion provided in the vehicle.

2. The charging connector according claim 1, further comprising:
    a lock button that locks the charging connector to a connection portion that is provided in the vehicle; and
    a switch that connects the signal line and the load according to manipulation of the lock button.

3. The charging connector according to claim 2, wherein:
    the lock button is capable of being manipulated to a locked state and to a released state; and
    the switch connects the signal line and the load when in the released state, and electrically separates the load from the signal line when in the locked state.

4. The charging connector according to claim 1, wherein the lighting includes a light-emitting diode.

5. The charging connector according to claim 1, further comprising a switch that connects the signal line and the load according to presence/absence of alternating current that flows in the electric power line.

6. The charging connector according to claim 5, wherein:
    the load includes a display portion that is provided in the charging connector, and that indicates that the charging of the electric storage device is being executed; and
    the display portion is switched in state of display by the switch.

7. The charging connector according to claim 6, wherein the display portion includes a light-emitting diode that is connected to the signal line by the switch when alternating current flows in the electric power line.

8. The charging connector according to claim 1, wherein:
the charging connector is constructed so as to be connectable to the connection portion provided in the vehicle;
the load includes a lighting that illuminates the connection portion, and a display portion that displays state of execution of the charging; and
the charging connector further includes a first switch that connects the signal line and the lighting, and a second switch that connects the signal line and the display portion.

9. The charging connector according to claim 8, wherein:
the charging connector further includes a lock button that locks the charging connector to the connection portion;
the first switch connects the signal line and the lighting according to manipulation of the lock button; and
the second switch connects the signal line and the display portion when alternating current is flowing in the electric power line.

10. The charging connector according to claim 9, wherein:
the load includes a plurality of light-emitting diodes that function as the lighting and the display portion;
the first switch is connected to the plurality of light-emitting diodes so as to cause electric current to flow in a first group of at least one light-emitting diode, among the plurality of light-emitting diodes;
the second switch is connected to the plurality of light-emitting diodes so as to cause electric current to flow in a second group of at least one light-emitting diode, among the plurality of light-emitting diodes; and
the first group and the second group share at least one light-emitting diode.

11. The charging connector according to claim 10, wherein:
the plurality of light-emitting diodes are connected in series;
the first switch electrically connects an end of the plurality of light-emitting diodes connected in series to the signal line; and
the second switch electrically connects an intermediate tap of the plurality of light-emitting diodes connected in series, to the signal line.

12. The charging connector according to claim 1, wherein:
the charging connector is connected to an end of the charging cable;
a connection unit for connection to an electric power source is connected to another end of the charging cable; and
a circuit breaker is provided between the charging connector and the connection unit in the charging cable.

13. The charging connector according to claim 12, wherein the circuit breaker includes a signal generation circuit that generates the control signal, and a resistance element that is connected between the signal line and an output of the signal generation circuit.

14. A charging cable unit that connects a vehicle and an electric power source provided outside the vehicle, in order to charge an electric storage device that is mounted in the vehicle, comprising:
a charging cable which includes a signal line for sending a control signal that carries information, and an electric power line for sending electric power, and which is provided for connecting the vehicle and the electric power source at a time of charging the electric storage device; and
a charging connector that is connected to an end of the charging cable, and that is constructed so as to be connectable to a connection portion that is provided in the vehicle, wherein
the charging connector includes an electric power terminal to which electric power is supplied from the electric power line, a signal terminal to which the control signal is transmitted from the signal line, and a load capable of being driven by a signal from the signal line; and wherein
the load includes a lighting that is provided in the connector and that illuminates the connection portion provided in the vehicle.

* * * * *